(12) United States Patent
Kobayashi et al.

(10) Patent No.: US 6,978,726 B2
(45) Date of Patent: Dec. 27, 2005

(54) COMBUSTION WITH REDUCED CARBON IN THE ASH

(75) Inventors: Hisashi Kobayashi, Putnam Valley, NY (US); Lawrence E. Bool, III, Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/436,163

(22) Filed: May 13, 2003

(65) Prior Publication Data

US 2004/0074426 A1 Apr. 22, 2004

Related U.S. Application Data

(60) Provisional application No. 60/380,717, filed on May 15, 2002.

(51) Int. Cl.[7] .............................. F23D 1/00; F23B 7/00
(52) U.S. Cl. ..................................... 110/347; 110/342
(58) Field of Search ....................... 110/261, 263, 347, 110/342, 345; 431/8, 10, 181, 187, 351

(56) References Cited

U.S. PATENT DOCUMENTS

| | | | |
|---|---|---|---|
| 3,656,878 A | 4/1972 | Wright | 431/10 |
| 3,820,320 A | 6/1974 | Schirmer et al. | 60/39.06 |
| 3,826,079 A | 7/1974 | Quigg et al. | 60/39.06 |
| 3,873,671 A | 3/1975 | Reed et al. | 432/235 |
| 4,193,773 A | 3/1980 | Staudinger | 48/210 |
| 4,329,932 A | 5/1982 | Takahashi et al. | 110/347 |
| 4,343,606 A | 8/1982 | Blair et al. | 431/10 |
| 4,388,062 A | 6/1983 | Bartok et al. | 431/10 |
| 4,408,982 A | 10/1983 | Kobayashi et al. | 431/10 |
| 4,427,362 A | 1/1984 | Dykema | 431/4 |
| 4,488,866 A | 12/1984 | Schirmer et al. | 431/4 |
| 4,495,874 A | 1/1985 | Greskovich et al. | 110/347 |
| 4,515,095 A | 5/1985 | Greskovich et al. | 110/347 |
| 4,523,530 A | 6/1985 | Kaminaka et al. | 110/264 |
| 4,541,796 A | 9/1985 | Anderson | 431/187 |
| 4,556,384 A | 12/1985 | Laurenceau et al. | 431/160 |
| 4,591,331 A | 5/1986 | Moore | 431/16 |
| 4,596,198 A | 6/1986 | Greskovich et al. | 110/347 |
| 4,761,132 A | 8/1988 | Khinkis | 431/10 |
| 4,797,087 A | 1/1989 | Gitman | 431/10 |
| 4,863,371 A | 9/1989 | Ho | 431/9 |
| 4,878,830 A | 11/1989 | Henderson | 431/10 |
| 4,946,382 A | 8/1990 | Kobayashi et al. | 431/8 |
| 4,957,050 A | 9/1990 | Ho | 110/346 |
| 4,969,814 A | 11/1990 | Ho et al. | 431/8 |
| 4,973,346 A | 11/1990 | Kobayashi et al. | 65/135 |
| 4,988,285 A | 1/1991 | Delano | 431/5 |
| 5,000,102 A | 3/1991 | Ho | 110/346 |
| 5,048,761 A | 9/1991 | Kim | 241/19 |
| 5,076,779 A | 12/1991 | Kobayashi | 431/5 |

(Continued)

FOREIGN PATENT DOCUMENTS

DE 4142401 6/1993

(Continued)

OTHER PUBLICATIONS

"Transfert de chaleur et pollution"; Michelfelder et al.; Revue Generale de Thermique; Extrait du no. 196, avril 1978; p. 324 (with translation).

(Continued)

*Primary Examiner*—Kenneth Rinehart
(74) *Attorney, Agent, or Firm*—Donald T. Black (57) ABSTRACT

Combustion of coal in which oxygen is injected into the coal as it emerges from burner produces ash having reduced amounts of carbon.

22 Claims, 8 Drawing Sheets

U.S. PATENT DOCUMENTS

| | | | |
|---|---|---|---|
| 5,085,156 A | 2/1992 | Dykema | 110/347 |
| 5,158,445 A | 10/1992 | Khinkis | 431/10 |
| 5,186,617 A | 2/1993 | Ho | 431/9 |
| 5,195,450 A | 3/1993 | Marion | 110/347 |
| 5,201,650 A | 4/1993 | Johnson | 431/9 |
| 5,203,859 A | 4/1993 | Khinkis et al. | 432/30 |
| 5,213,492 A | 5/1993 | Ho | 431/10 |
| 5,242,296 A | 9/1993 | Tuson et al. | 431/10 |
| 5,266,024 A | 11/1993 | Anderson | 431/11 |
| 5,266,025 A * | 11/1993 | Francis et al. | 431/187 |
| 5,291,841 A | 3/1994 | Dykema | 110/347 |
| 5,308,239 A | 5/1994 | Bazarian et al. | 431/10 |
| 5,387,100 A | 2/1995 | Kobayashi | 431/10 |
| 5,411,394 A | 5/1995 | Beer et al. | 431/9 |
| 5,413,476 A | 5/1995 | Baukal, Jr. et al. | 431/10 |
| 5,431,559 A | 7/1995 | Taylor | 431/164 |
| 5,439,373 A | 8/1995 | Anderson et al. | 431/10 |
| 5,454,712 A | 10/1995 | Yap | 431/10 |
| 5,580,237 A * | 12/1996 | Leger | 431/8 |
| 5,601,425 A | 2/1997 | Kobayashi et al. | 431/18 |
| 5,609,662 A | 3/1997 | Kobayashi et al. | 65/135.1 |
| 5,611,682 A | 3/1997 | Slavejkov et al. | 431/8 |
| 5,611,683 A | 3/1997 | Baukal, Jr. et al. | 431/10 |
| 5,697,306 A | 12/1997 | LaRue et al. | 110/261 |
| 5,724,897 A * | 3/1998 | Breen et al. | 110/261 |
| 5,725,366 A | 3/1998 | Khinkis et al. | 431/10 |
| 5,755,818 A * | 5/1998 | Tuson et al. | 431/10 |
| 5,832,847 A | 11/1998 | Leisse et al. | 110/347 |
| 5,857,846 A | 1/1999 | Sattelmayer et al. | 431/284 |
| 5,871,343 A | 2/1999 | Baukal, Jr. et al. | 431/10 |
| 5,904,475 A | 5/1999 | Ding | 431/8 |
| 5,924,858 A | 7/1999 | Tuson et al. | 431/10 |
| 5,931,654 A | 8/1999 | Chamberland | 431/8 |
| 5,937,770 A | 8/1999 | Kobayashi et al. | 110/263 |
| 5,960,724 A | 10/1999 | Toqan et al. | 110/347 |
| 6,007,326 A | 12/1999 | Ryan, III et al. | 431/9 |
| 6,030,204 A | 2/2000 | Breen et al. | 431/4 |
| 6,085,673 A | 7/2000 | Bakker et al. | 110/343 |
| 6,085,674 A | 7/2000 | Ashworth | 110/347 |
| 6,090,182 A | 7/2000 | Riley | 75/460 |
| 6,113,389 A | 9/2000 | Joshi et al. | 432/180 |
| 6,164,221 A * | 12/2000 | Facchiano et al. | 110/347 |
| 6,171,100 B1 | 1/2001 | Joshi et al. | 431/182 |
| 6,200,128 B1 | 3/2001 | Kobayashi | 431/5 |
| 6,206,949 B1 | 3/2001 | Kobayashi et al. | 75/460 |
| 6,217,681 B1 | 4/2001 | Bazarian et al. | 148/688 |
| 6,244,200 B1 | 6/2001 | Rabovitser et al. | 110/347 |
| 6,254,379 B1 | 7/2001 | Bool, III et al. | 431/4 |
| 6,276,928 B1 | 8/2001 | Joshi et al. | 432/26 |
| 6,289,851 B1 | 9/2001 | Rabovitser et al. | 122/95.2 |
| 6,293,105 B1 | 9/2001 | Claesson et al. | 60/748 |
| 6,314,896 B1 | 11/2001 | Marin et al. | 110/345 |
| 6,325,003 B1 | 12/2001 | Ashworth et al. | 110/345 |
| 6,357,367 B1 | 3/2002 | Breen et al. | 110/345 |
| 6,394,790 B1 | 5/2002 | Kobayashi | 431/10 |
| 6,398,546 B1 | 6/2002 | Kobayashi | 432/13 |
| 6,409,499 B1 | 6/2002 | Feldermann | 431/8 |
| 6,418,865 B2 | 7/2002 | Marin et al. | 110/345 |
| 6,519,973 B1 | 2/2003 | Hoke, Jr. et al. | 65/134.4 |
| 6,568,185 B1 | 5/2003 | Marin et al. | 60/649 |
| 6,619,041 B2 | 9/2003 | Marin et al. | 60/653 |
| 6,699,029 B2 | 3/2004 | Kobayashi et al. | 431/10 |
| 6,699,030 B2 | 3/2004 | Bool, III et al. | 431/10 |
| 6,699,031 B2 | 3/2004 | Kobayashi et al. | 431/10 |
| 6,702,569 B2 | 3/2004 | Kobayashi et al. | 431/10 |

FOREIGN PATENT DOCUMENTS

| | | |
|---|---|---|
| EP | 0187441 | 9/1985 |
| EP | 0653590 | 11/1994 |
| WO | 02055933 | 7/2002 |

OTHER PUBLICATIONS

"Strategies for Controlling Nitrogen Oxide Emissions During Combustion of Nitrogen-Bearing Fuels"; Sarofim et al.; The American Institute of Chemical Engineers, 1978 No. 175, vol. 74; pp. 67-92.

"$NO_x$ and Carbon Emission Control in Coal-Water Slurry Combustion"; Farmayan et al.; Sixth International Symposium on Coal Slurry Combustion and Technology, Orlando, Florida, 1984.

"$CO_2$ Recovery from PCF Power Plant with $O_2/CO_2$ Combustion Process"; Shin-ichi Takano et al.; IHI Engineering Review, vol. 28 No. 2 Oct. 1995; pp. 160-164.

"Characteristics of Single Particle Coal Combustion"; Timothy et al.: Nineteenth Symposium (International) on Combustion; The Combustion Institute, 1962; pp. 1123-1130.

"$No_x$ Emission Characteristics of Industrial Burners and Control Methods under Oxygen Enriched Combustion Conditions"; Kobayashi et al.; International Flame Research Foundation. The Ninth Members Conference, Noordwijkerhout, 1989.

"$No_x$ Measurements in Oxygen-Enriched, Air-Natural Gas Combustion Systems"; C.E. Baukal et al., Air Products and Chemicals, Inc., 1990.

"Low Nox Technologies for Natural Gas-Fired Regenerative Glass Melters"; Panahi et al.; The Scandinavian Society of Glass Technology Annual Meeting, Oslo, Norway, 1992.

"Advances in the Use of Computer Simulations for Evaluating Combustion Alternative"; Eddings et al.; The Third CREST International Symposium on High Temperature Air Combustion and Gasification, Yokohama, Japan, 2000.

"Oxy-Coal Injection at Cleveland Ironworks"; Campbell et al.; Ironmaking and Steelmaking, 1992, vol. 19, No. 2; pp. 120-125.

"Effect of Direct Oxygen Injection on Combustion of Injected Coal"; Riley et al.; Proc. 2nd International Congress on the Science and Technology of Ironmaking. 1998; pp. 683-688.

"Oxygen for NOx Control—A Step Change Technology"; Bool et al., The Nineteenth Annual International Pittsburgh Coal Conference, Pittsburgh, PA, 2002.

"NOx Reduction From A 44-MW Wall-Fired Boiler Utilizing Oxygen Enhanced Combustion": Bool et al.; Clearwater Conference, Mar. 10, 2003.

"CFD Evaluation of Oxygen Enhanced Combustion: Impacts On NOx Emmissions, Carbon-In-Flyash and Waterwall Corrosion"; Cremer et al.; Mar. 10, 2003.

"Demostration of Oxygen-Enhanced Combustion at the James River Power Station, Unit 3"; Bool et al.; The Mega Symposium, Washington, D.C., May 20, 2003.

"Oxygen Enriched Air/Natural Gas Burner System Development", Final Report Jul. 1984-Sep. 1989; Gas Research Institute, Chicago, Illinois; pp. 140 and 188-189.

Bose, A.C. et al., "Coal Composition Effects on Mechanisms Governing the Destruction of NO and Other Nitrogenous Species during Fuel-Rich Combustion", Energy & Fuels, vol. 2, pp. 301-308 (1988).

Sarofim, A.F. et al., "Strategies for Controlling Nitrogen Oxide Emissions during Combustion of Nitrogen-Bearing Fuels", 69th Annual Meting of American Institute of Chemical Engineers, Chicago, IL, pp. 67-92 (1976).

* cited by examiner

COMBUSTION WITH REDUCED CARBON IN THE ASH

This application claims priority from U.S. Provisional Application Ser. No. 60/380,717 filed May 15, 2002.

This invention was made with United States Government support under Cooperative Agreement No. DE-FC 26-00NT40756 awarded by the Department of Energy. The United States Government has certain rights in the invention.

FIELD OF THE INVENTION

The present invention relates to production of salable ash from combustion of hydrocarbon fuels such as coal.

BACKGROUND OF THE INVENTION

In combustion of coal in furnaces such as in utility boilers, a large amount of ash is produced from the mineral matters originally contained in coal. The ash content of coal ranges from a few percent to over 30%, but the bulk of bituminous coal used for power generation in the U.S. has ash content within the range of 6 to 20. Ash generated in utility boilers is often sold as raw material for cement manufacture and for other processes. If the residual carbon content in ash is more than several percent, it is not acceptable for cement manufacture due to its color and its impact on the properties of cement. Ash with high carbon content, if no other uses could be found, is land filled at a significant cost.

Another concern with high carbon content in ash is potential increase in slagging and fouling tendency by ash. It has previously been stated that if carbonaceous residues become embedded in the deposits, a locally reducing atmosphere can be created in the deposit which can lead to a significant depression of slag melting point temperatures, especially if the ash is of high iron content.

The residual carbon content in ash is strongly influenced by the combustion conditions as well as the type of coal and mineral matters and the fineness of pulverized coal particles. In general the carbon content in ash increases with decreasing excess air for combustion. On the other hand, NOx emissions decrease significantly with decreasing excess air. Due to the more stringent emissions regulations for NOx, many coal fired combustion systems have been converted to low NOx combustion systems, in which combustion takes place in two stages, a fuel rich first stage where fuel bound nitrogen species are converted to molecular nitrogen and a fuel lean second stage where additional combustion air is mixed to complete combustion. The fuel rich combustion process used in low NOx combustion methods delay the combustion of char and tends to increase carbon content of ash at the furnace exit. Thus low NOx combustion methods tend to cause problems in the quality of ash as a salable by-product.

In combustion of coal, volatile combustion is very rapid and char combustion is slow. The unburned carbon content (UBC) in ash is determined by the slower char combustion step. The rate of carbon burnout depends on the particle size, pore structure, reactivity of char, temperature and partial pressure of oxygen in the atmosphere, among other things. Rapid mixing of coal and combustion air and more intense combustion with high excess oxygen are effective in reducing UBC. However, these conditions tend to increase NOx emissions sharply. Thus, design compromise is generally made in the burner-boiler design to achieve acceptable UBC while minimizing NOx emissions.

Ultra fine grinding of coal is an effective way of accelerating the char burn out and to reduce UBC. However, the cost of new coal pulverizing machine and the extra energy required for ultra fine grinding often make it uneconomic for most retrofit applications. Post combustion treatment of ash is possible and technologies exist to oxidize the residual carbon in ash in a separate process. However, post combustion treatment is expensive and not widely practiced.

Oxygen enrichment was tried in a test furnace fired with a coal-water slurry for NOx and carbon emission control under unstaged conditions. (W. F. Farmayan, et.al., "NOx and Carbon Emission Control in Coal-Water Slurry Combustion", Sixth International Symposium on Coal Slurry Combustion and Technology, Orlando, Fla., Jun. 25–27, 1984.) Oxygen was injected from four injection tubes (about ¼" ID) around the center fuel pipe. (FIG. 4 of the paper) The amount of oxygen injection was equivalent to oxygen enrichment of combustion air to 22 to 24% $O_2$. This paper concluded that the effect of $O_2$ enrichment near the burner on carbon burnout was found to be weak, particularly toward the flame tail end. The reason is thought to be that the relatively large unburned particles experience the same oxygen-depleted environment at the flame tail end as would those in a flame without oxygen enrichment. It is expected that more benefit would be gained from the point of view of carbon burnout by injection of $O_2$ where it is needed most, e.g., behind the flame front rather than before.

Comparison of the oxygen injection method and results from this reference to the present invention has to consider the difference in burner configurations and fuel property. Coal water slurries (CWS) typically contain about 30% water and have to be atomized for combustion. The paper concluded that atomization quality of the slurry was the critical variable affecting carbon burn out. Unlike the traditional pulverized coal combustion, CWS must be atomized, and the droplets containing multiple coal particles must vaporize water before coal devolatilization and ignition can take place. Multiple coal particles in a single water droplet may agglomerate to form a larger particle. Thus the results from this reference cannot be applicable directly to pulverized coal combustion.

U.S. Pat. No. 4,495,874 discloses oxygen enrichment of primary and/or secondary air in pulverized coal fired burners in order to increase the steam rate of a boiler firing high ash pulverized coal. Although the patent does not teach the effects of oxygen enrichment on UBC, FIG. 4 shows significant increases in furnace temperatures near the burner with 2% oxygen enrichment, but little with 1% oxygen enrichment.

U.S. Pat. No. 4,596,198 discloses oxygen enrichment of primary air in pulverized coal fired burners in order to reduce slag deposition in coal fired utility boilers. The patent teaches 1% to 7% oxygen enrichment, preferably 2 to 5% enrichment, (which as defined in that patent is based on the oxygen addition to the total amount of combustion air) of primary air to reduce slag deposition. Furthermore it states that oxygen enrichment of 1% offers little, if any, benefit in slagging reduction.

O. Marin, et.al., discuss the benefits of oxygen for coal combustion in a paper entitled "Oxygen Enrichment in Boiler" (2001 AFRC/JFRC/IEA Joint International Combustion Symposium, Kaui, Hi., Sep. 9–13, 2001). They proposed injection of oxygen in the over fire air (also described as "tertiary air" in this paper), to reduce unburned carbon in ash, or Loss on Ignition (LOI), without increasing NOx emission. The computer simulation results reported by Marin, et al. compared the baseline air case and an oxygen enriched case with a high velocity, oxygen enriched stream in the tertiary air (also termed over-fire air). According to Marin, et.al., "An increase of 5% on heat transfer in the combustion chamber, combined with a 7% absolute increase in char burnout are noted." (page 8)

BRIEF SUMMARY OF THE INVENTION

Broadly stated, the present invention is a method for combusting coal and producing ash which has a reduced carbon content, comprising providing a combustion device, feeding air and a nonaqueous stream of coal through a burner into said device, and combusting the coal in the combustion device, while feeding oxygen into said coal as the coal emerges from said burner so that said oxygen combusts with said coal in an amount of said oxygen which is less than 20% or even than 25% of the stoichiometric amount required for complete combustion of said coal, wherein the carbon content of the ash generated by said combustion is lower than the carbon content of ash generated by combustion carried out without said oxygen feeding step but under otherwise identical conditions.

One aspect of the present invention, which can be considered a method for retrofitting existing combustion devices, is a method for reducing the carbon content of ash formed by combustion of coal in a combustion device, comprising providing a combustion device that has a primary combustion zone and a burnout zone, feeding air and a nonaqueous stream of coal through a burner into said primary combustion zone and combusting the coal in the primary combustion zone in a flame that contains a fuel-rich zone, while feeding oxygen into said coal as it emerges from said burner so that said oxygen combusts with said coal in said fuel-rich zone, wherein the amount of oxygen fed is less than 20%, preferably less than 15%, more preferably less than 10%, most preferably less than 5% of: the stoichiometric amount required for complete combustion of said coal and keeps the fuel-rich zone fuel-rich, while reducing the amount of air fed into said fuel-rich zone through said burner by an amount containing within 10% of the amount of oxygen fed into said fuel, wherein the carbon content of the ash generated by said combustion is lower than the carbon content of ash generated by combustion carried out without said oxygen feeding step but under otherwise identical conditions.

Another aspect of the present invention can be considered a method for operating a combustion device, whether retrofitted or constructed new embodying the features of this invention, comprising feeding air and a nonaqueous stream of coal through a burner into said device, and combusting said coal in said device in a flame that has a fuel-rich zone, while feeding oxygen into said coal as it emerges from said burner so that said oxygen combusts with said coal in said fuel-rich zone, wherein the amount of oxygen fed is less than 20%, preferably less than 15%, more preferably less than 10%, most preferably less than 5% of the stoichiometric amount required for complete combustion of said coal and keeps the fuel-rich zone fuel-rich, while feeding air from a source other than said burner into a region within said device outside said fuel-rich zone, in an amount containing sufficient oxygen that the total amount of oxygen fed into said device is at least the stoichiometric amount needed for complete combustion of said coal, wherein the carbon content of the ash generated by said combustion is lower than the carbon content of ash generated by combustion carried out without said oxygen feeding step but under otherwise identical conditions.

Tests by the present inventors have unexpectedly shown significant reduction in unburned carbon in the ash when a small amount of oxygen is injected near the burner toward the coal stream. These results were opposite to the teaching of prior art sources such as W. F. Farmayan, et.al. and O. Marin, et.al. that injection of oxygen in the later stage of combustion was recommended and expected to provide more benefits for reduction in the amount of unburned carbon. These results are also not suggested by the aforementioned U.S. Pat. Nos. 4,495,874 and 4,596,198, particularly in that said patents are directed to reduction of slagging during combustion of coals having ash contents above 5 wt. % with oxygen enrichment of primary or secondary air, whereas the present invention is directed to reduction of the carbon content of ash formed with direct injection of oxygen near the burner toward the coal stream.

The present invention will often provide the additional benefit that combustion carried out as described herein produces a significantly lower amount of nitrogen oxides ("NOx"), that is, oxides of nitrogen such as but not limited to $NO$, $NO_2$, $NO_3$, $N_2O$, $N_2O_3$, $N_2O_4$, $N_3O_4$, and mixtures thereof.

As used herein the term "stoichiometric ratio" or SR when used in the context of an oxygen-containing stream and a feed stream of material that can be combusted with oxygen in the stream means the ratio of oxygen in the oxygen-containing stream to the total amount of oxygen that would be necessary to convert fully all carbon, sulfur and hydrogen present in the substances comprising the feed stream into carbon dioxide, sulfur dioxide and water.

As used herein, the term "fuel-rich" means having a stoichiometric ratio less than 1.0.

As used herein, "nonaqueous" means not suspended in, dissolved in, or dispersed in water, and not containing water, except that it does not exclude adsorbed water or water of hydration.

As used herein, the term "primary combustion zone" means the region within a combustion device immediately adjacent the burner outlets and which is mostly occupied by the flame or flames from the burner or burners.

As used herein, the term "burn out zone" means the region within a combustion device that is between the primary combustion zone and the flue, outside the flame or flames that are in the primary combustion zone, where overfire air is injected and the residual fuels and combustibles from the primary combustion zone are burned with overfire air.

As used herein, the term "primary combustion air" means air that has already been commingled with fuel as the fuel and this air are fed into a combustion device, e.g. through an orifice of a burner.

As used herein, the term "secondary combustion air" means air that is fed into a combustion device through one or more orifices of a burner, but which has not been commingled with fuel as this air is fed into the combustion device.

A burner that has orifices for secondary air may have additional orifices for feeding air which additional orifices are further from the point of entry of the fuel through the burner than are the orifices for the secondary air. As used herein, the term "tertiary combustion air" means air that is fed into a combustion device through such additional orifices. If a burner also has orifices positioned even further from the point of entry of the fuel than the orifices for the tertiary air, then air fed through such further orifices is termed herein "quaternary combustion air".

As used herein, the term "over fire air" (or "OFA") means air which is injected into a combustion device separately from the burner or burners in the combustion device to provide a large fuel rich primary combustion zone and a burnout zone where combustion is completed by mixing OFA with the unburned fuel and the products of partial combustion from the primary combustion zone.

References herein to feeding "oxygen", to the "oxygen" that is fed, and other references herein to the use of "oxygen" in an analogous context, mean gaseous streams that contain at least 35 vol. % $O_2$—Preferably, oxygen is provided as a gaseous stream containing at least 50 vol. % $O_2$, more preferably containing at least 80 vol. % $O_2$, and even more preferably containing at least 90 vol. % $O_2$. It should also be understood that references herein to combustion or reaction involving "oxygen" refer to $O_2$ itself.

As used herein, the "carbon content" of ash is the amount of the ash that is either carbon or a chemical compound that contains carbon, e.g. any organic (carbonaceous) compound.

DETAILED DESCRIPTION OF THE INVENTION

The invention will be described with reference to the Figures, although a description that refers to the Figures is not intended to limit the scope of that which is considered to be the present invention.

Figure 1:
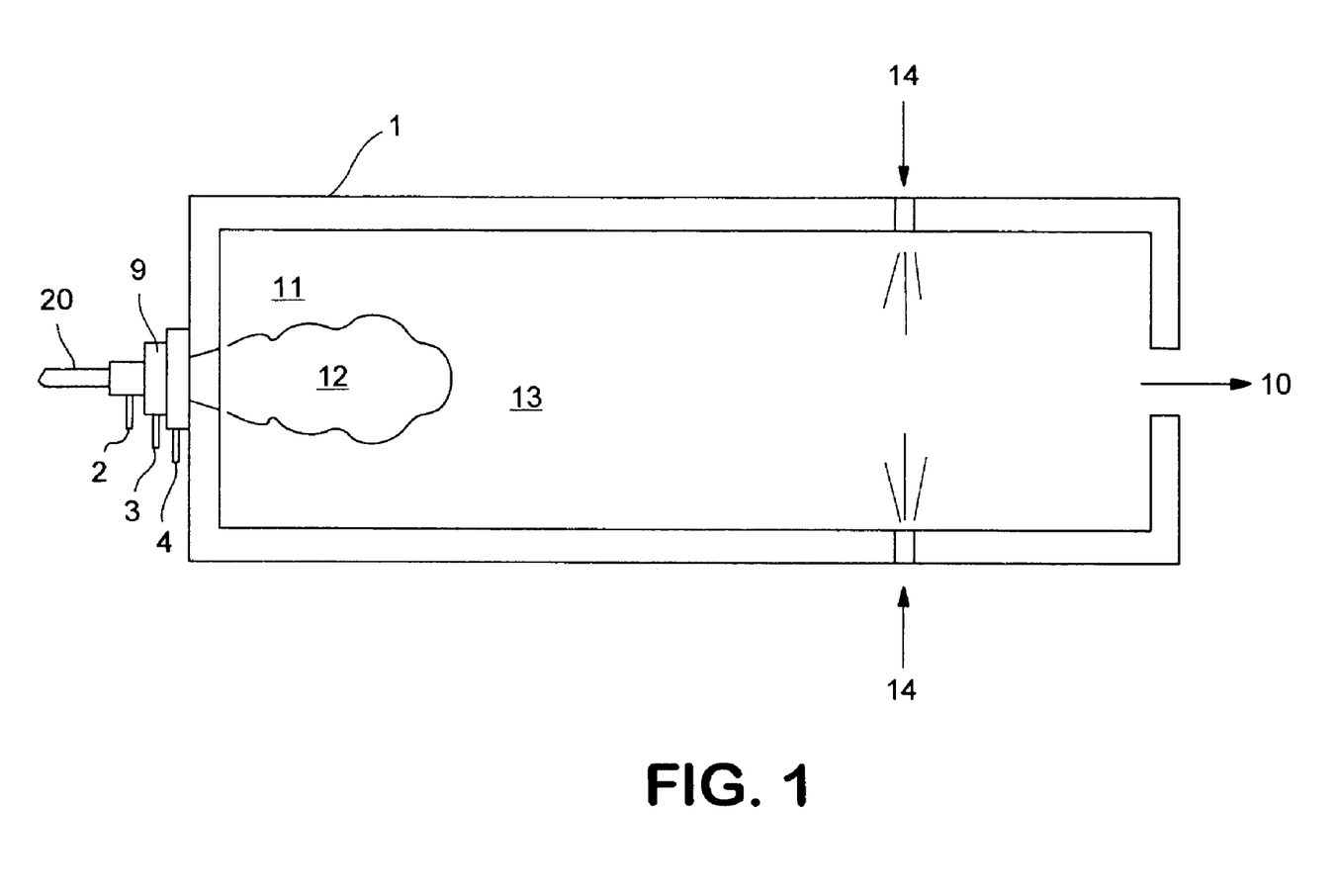
FIG. 1 is a cross-sectional representation of one embodiment of apparatus for carrying out the present invention.

FIG. 1 shows combustion device 1, which can be any apparatus wherein combustion is carried out in the interior 11 of the device. Preferred combustion devices include furnaces and boilers which are used to generate electric power by conventional means, not shown.

Figure 2:
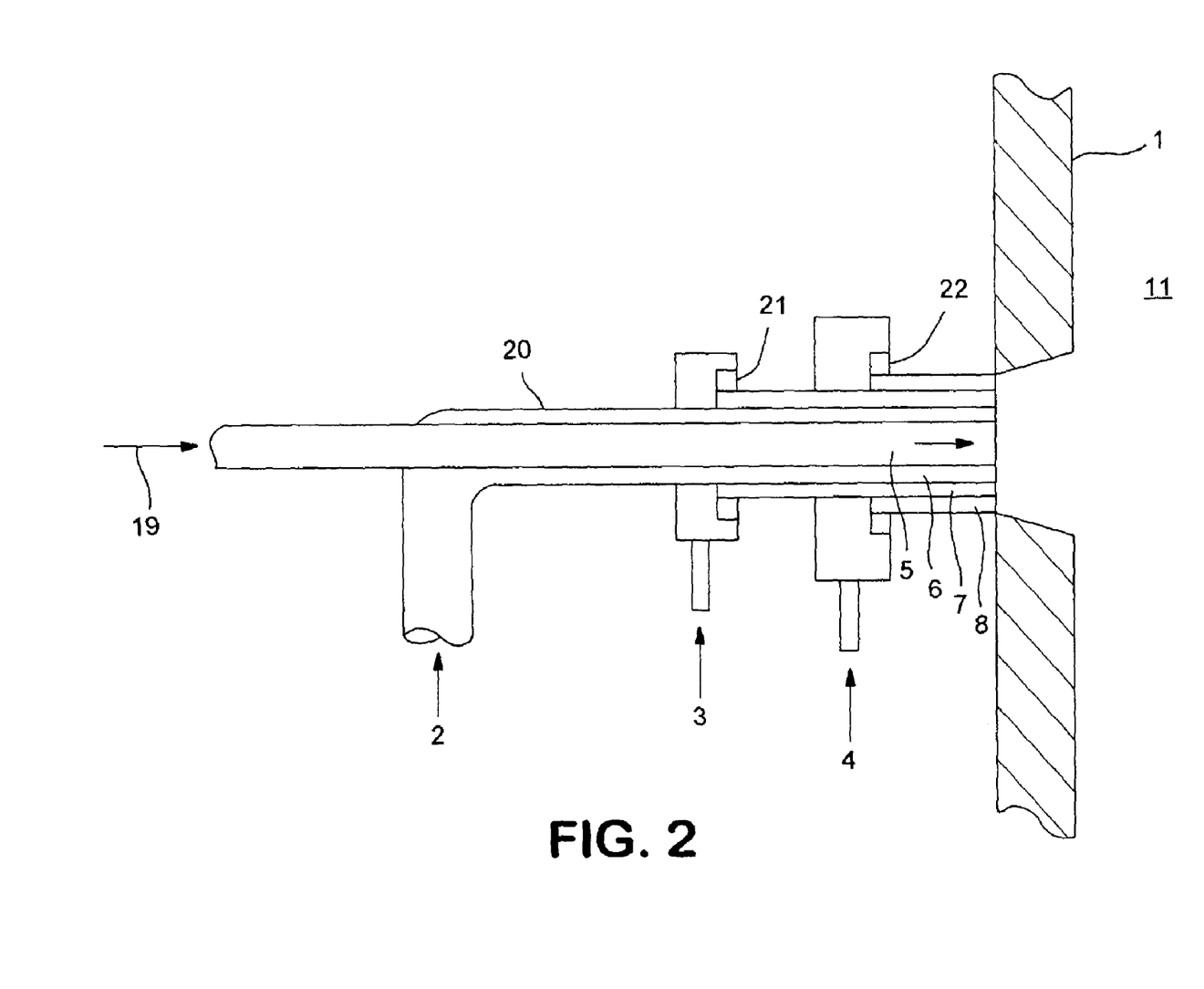
FIG. 2 is a cross-sectional representation of a burner useful for carrying out the present invention.

Burner 9 in an end wall of combustion device 1 feeds coal, air and oxygen from sources thereof outside the combustion device 1 into the interior 11 of combustion device 1. Burner 9 is preferably comprised of several concentrically arranged passages, details of which are as shown in FIG. 2, although other constructions to the same effect can be used. The coal with primary combustion air 2 is fed into combustion device 1 through annular passage 6, disposed concentrically around lance 20 through which oxygen 1 is fed as described herein. Preferably, the coal is propelled through burner 9 into the interior 11 of combustion device 1, by blowers and impellers of conventional design which conventionally feed pulverized coal with the aid of transport air or primary air.

Secondary combustion air 3 is fed through swirl vanes 21 to impart swirling motion into combustion device 1, preferably through a concentrically arranged space 7 surrounding the annular space through which the coal is fed. Preferably tertiary combustion air 4 is fed through swirl vanes. 22 to impart swirling motion into combustion device 1, preferably through a concentrically arranged space 8 surrounding the annular space 7. Preferably, the oxygen is fed into the interior 11 of the combustion device separately and spaced apart from the secondary and tertiary combustion air. That is, the oxygen that is fed through burner 9 in accordance with this invention is not commingled with the combustion air before it is fed into combustion device 1.

Before a combustion device is retrofitted in accordance with the present invention to reduce the carbon content of the ash, lance 20 for feeding oxygen is not yet present. Combustion is carried out between the coal and the oxygen in the combustion air, resulting in formation of a flame 13. In the region of the flame closest to the end of burner 9, that is, where the coal emerges from the burner, that region of the flame is a fuel-rich zone 12. The area of the flame around its periphery is relatively lean due to secondary and tertiary air which have not been fully mixed and reacted with coal.

Then, lance 20 is added. Alternatively, a burner that feeds coal and combustion air is replaced with a burner that performs as shown in FIG. 1.

Preferably, air (known as overfire air) is also fed through opening 14 into the interior of combustion device 1, to provide additional oxygen helping to achieve complete combustion of the coal while achieving reduced NOx emissions. The oxygen in the combustion air fed through burner 9, combined with the oxygen fed at opening 14, are sufficient to enable complete combustion of the coal, possibly with up to 10 to 20 volume percent excess oxygen over the stoichiometric amount required for the complete combustion of the coal.

Preferably, the combustion air and the coal are fed so as to swirl about a longitudinal axis, thereby improving commingling of air and coal. Swirl can be achieved by known techniques, such as providing swirl vanes 21 and 22 before the outlets of the burner which direct the flow of the streams in the desired swirling direction.

The present invention improves, that is, lessens, the retention of carbon in the ash formed upon combustion, by feeding a small amount of oxygen into the entering coal stream as described herein. More specifically, the oxygen (by which is meant a gaseous stream comprising at least 35 vol. % $O_2$, preferably at least 50 vol. % $O_2$, more preferably at least 80 vol. % $O_2$, most preferably at least 90 vol. % $O_2$) is fed directly into the coal as it emerges from the burner and enters the interior 11 of combustion device 1. Thus, the particles of coal enter the combustion device with transport air (i.e., primary air) and the fuel-rich portion of flame 6, and mixed with a gaseous atmosphere that comprises at least 35% oxygen.

The oxygen is preferably fed through a lance or similar feed line that can be open at the end that opens into combustion device 1, or that is closed at the end and has one or more openings in its periphery adjacent that closed end, such that oxygen flows out through those openings directly into the coal entering the combustion device from the burner.

Figure 7A:
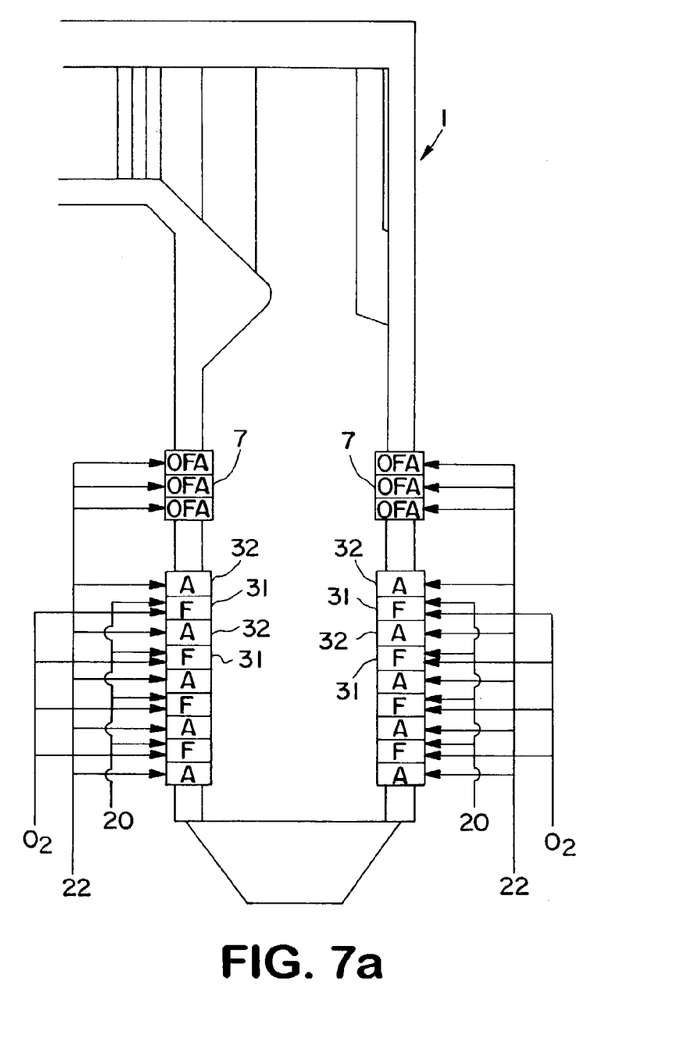
FIG. 7A is a cross-section view of another type of boiler furnace with which the present invention can be utilized, wherein coal and oxidant are fed from separate ports tangentially into the furnace.
Figure 7B:
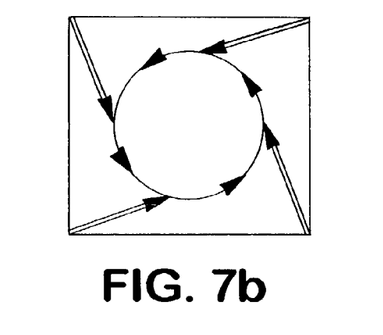
FIG. 7B is a top view of the furnace depicted in FIG. 7A, showing the tangential flow of coal and oxidant into the furnace.
Figure 7C:
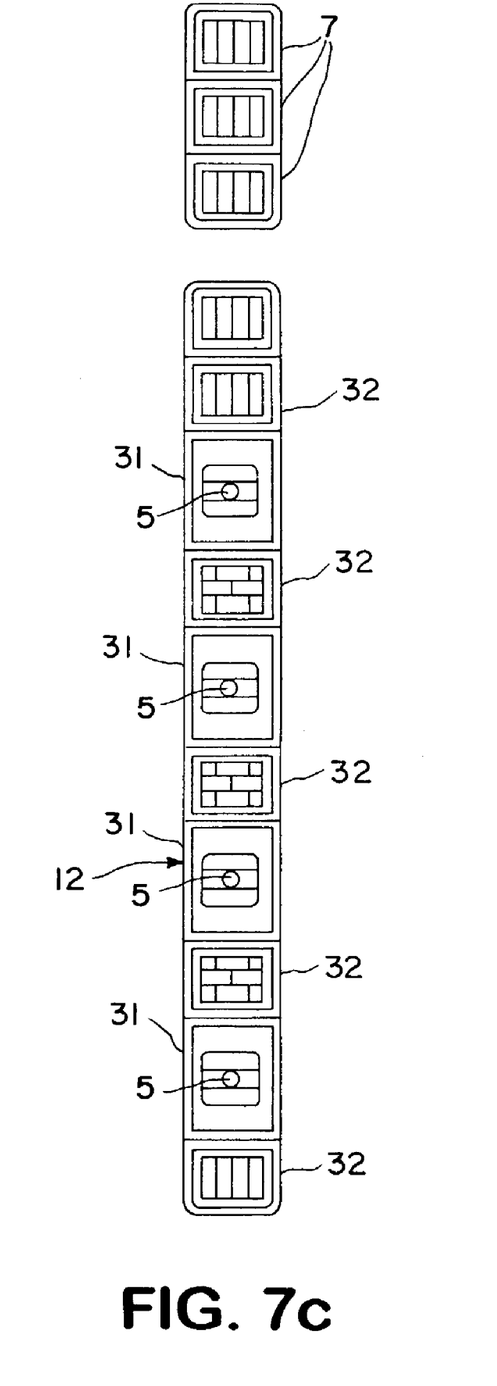
FIG. 7C is a front view from inside the furnace looking at the fronts of the ports.

Referring to FIGS. 7A and 7C, a tangentially fired furnace 1 comprises an array of ports for injecting coal, and ports for injecting combustion air, into the furnace interior. Typically the coal ports and the combustion air ports are arrayed in a vertical row, alternating with each other, as is illustrated in FIGS. 7A and 7C wherein ports 31 for injecting coal alternate with ports 32 for injecting combustion air. The coal combusts in the furnace interior with the combustion air. The furnace is also equipped with overfire air ports 7.

The present invention is readily adapted to furnaces having this type of construction, for instance by providing a lance 5 in one or more of the fuel ports for which it has been determined that oxidant needs to be injected so as to reduce the carbon content of the ash that will be produced, and then feeding oxidant in the required amounts through each such lance. Oxygen lances 5 can also be placed in one or more of the combustion air ports or outside of the air and fuel ports, and oxygen is injected from the lance(s) toward the adjacent coal stream.

The amount of oxygen fed in this manner is preferably sufficient to establish a stoichiometric ratio in the fuel-rich zone of flame 13 which is less than about 0.85 in order to achieve low NOx emissions as well as to produce ash with a low carbon content. The amount of oxygen fed through line 5 should be less than 20% or even than 25% of the stoichiometric amount required to the complete combustion of the coal. More preferably, the amount corresponds to less than 15% of the stoichiometric amount required for complete combustion of the coal.

At the same time, the amount of secondary combustion air 3 and tertiary combustion air fed through burner 9, into combustion device 1, need to be decreased by a stoichiometrically equivalent amount corresponding to the amount of oxygen fed via line 20.

Without intending to be bound by any particular explanation of the unexpected performance of this invention, the performance of the combustion device operated in accordance with this invention is consistent with a mechanism in which injection of oxygen near the coal stream promotes early ignition of the coal stream and significantly enhances the rate and the amount of the volatile yield from coal. Higher volatile yield reduces the amount of char that has to be oxidized in the later stage of combustion. Although the present oxygen injection method does not increase the partial pressure of oxygen in the atmosphere during the slow char burnout stage, as taught by the prior art, the reduction in the amount of char produced during the initial devolatilization and combustion stage is believed to provide an overwhelmingly beneficial impact in reducing the amount of unburned carbon remaining in the ash.

Figure 3A:
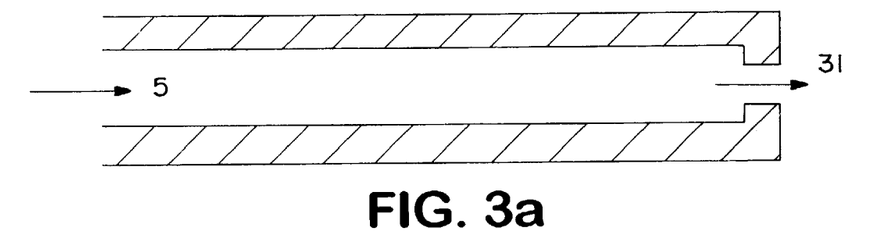
FIGS. 3a–3d are cross-sectional representations of lances useful for feeding oxygen into burners in accordance with the present invention.

FIGS. 3a through 3d show various lance configurations that can be employed. Other lance configurations can be used. In FIG. 3a, lance 5 ends with a single orifice 31 that is preferably oriented along the axis of the lance.

Figure 3B:
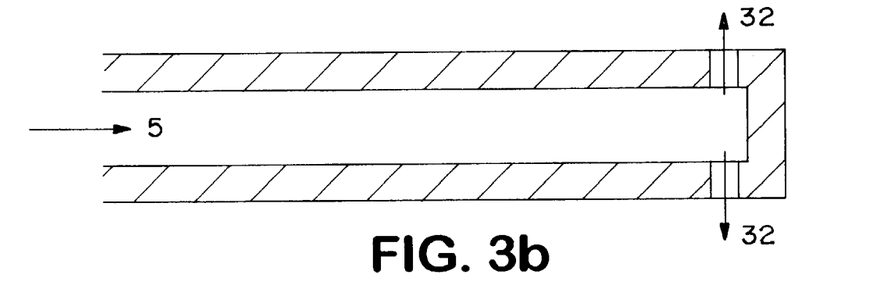

In FIG. 3b, the end of lance 5 is closed and two or more, preferably two to sixteen, more preferably four to eight nozzles 32 along the perimeter of the lance near the hot end of the lance are provided for radial oxygen injection. One to four or more nozzles can also be provided in the end of this lance.

Figure 3C:
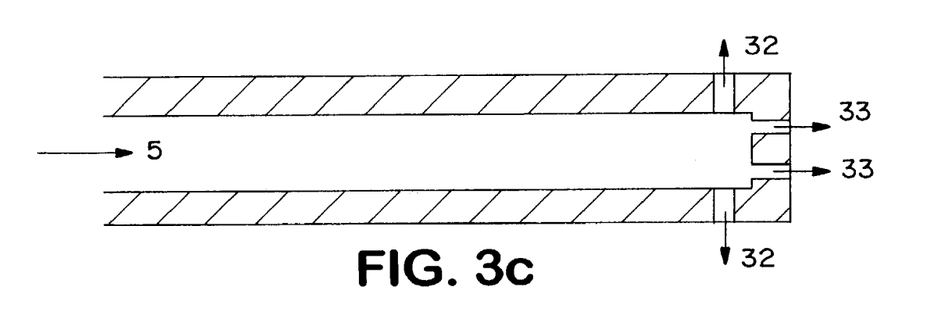

In FIG. 3c, two or more and preferably two to sixteen, more preferably four to eight nozzles 32 are provided radially near the closed downstream end of the lance 5, and two or more, preferably two to sixteen, preferably four to eight nozzles 33 are provided each of which forms an angle greater than 0 degrees and less than 90 degrees to the axis of the direction of flow of oxygen into the lance 5.

Figure 3D:
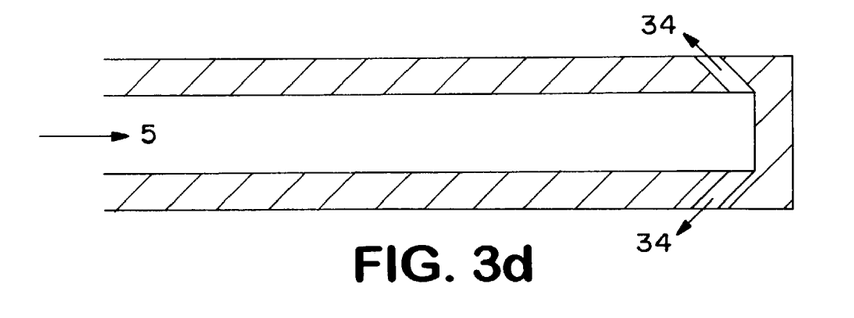

In FIG. 3d, two or more and preferably two to eight nozzles 34 are provided along the perimeter of the lance 5 near the hot end of lance 5, each of which forms an angle of 30 to 90 degrees, preferably an angle of 30 to 60 degrees with respect to the reverse of the direction of flow of oxygen into the lance 5.

In these and other lance embodiments the nozzles through the side of the lance can be arrayed on one or more than one circumference.

The optimal angle of oxygen injection for NOx control depends on the tangential and radial momentum of the surrounding air, the burner port geometry and the nature of the burner airflow pattern near the oxygen lance. Accordingly, for better results in burners having low radial air momentum, the optimal angle is 90° or greater from the axis of the burner, whereas obtaining better results in burners having higher radial momentum will generally require the angle to be reduced to avoid mixing the oxygen with the air stream. With highly radial air flow the optimal angle is 15° or less (largely axial injection). For those burners that use techniques that create a strong air flow component in the radial direction, such as high swirl with a shallow diverging burner port or air deflectors, oxygen nozzles that are primarily angled in the axial direction (angle of less than 30° from the axis) are optimal. For burners in which the air flow is predominantly axial (that is, the radial component of the air flow is small or non-existent) it is preferred to inject the oxygen in the radial direction (angles between 45° and 135° from the axial flow component).

Practice of the present invention in a manner as described herein that feeds the oxygen so that it combusts with the coal in the fuel-rich zone of the flame provides the advantage of reduced NOx formation along with the benefits of reduced carbon content in the ash.

The details of tests and simulation conditions are provided below.

EXAMPLE 1

A low NOx coal-air burner was fired at about 4 MMBtu/hr in a refractory lined test furnace with internal dimensions of about 3.6 ft wide ×3.6 ft high and 41 ft long. A pair of over fire air ports were located at about 10.5 ft inches from the burner exit. The burner is similar to one shown in FIG. 2 and consists of a central round passage and several annular passages for coal, air, oxygen and natural gas streams. The central passage was either used to insert an 1.9" OD and 1.5" ID oxygen lance-or blocked to provide a bluff body to enhance gas recirculation for flame stability. Coal and primary air were injected from the first annular passage of 3.068" OD and 1.9" ID. The second annular passage (4.026" OD and 3.5" ID) was used to inject either natural gas or oxygen. The third (6.065" OD and 4.5" ID) and the fourth (7.981" OD and 6.625" ID) annular passages were used for secondary and tertiary air flows and were equipped with variable swirl generators to impart swirling flows. The burner is designed to provide an aerodynamically staged combustion condition. The axial velocities of the primary air and secondary air are similar to provide a slow mixing of the secondary air with the coal stream. The tertiary air has a significantly higher velocity than that of the second air. Thus, the secondary air provides a "buffer" for mixing between the tertiary air and the coal stream. A relatively large fuel rich combustion zone is created along the axis of the burner with relatively gradual mixing of secondary and tertiary air along the length of the furnace.

Oxygen was injected through a round lance located in the axis of the burner. An oxygen nozzle, which has eight ¼ inch diameter radial holes and four ¼ inch diameter axial holes at the end of the lance, was used to inject oxygen and to mix with the surrounding annular coal stream.

With no oxygen addition at the burner, the loss on ignition (LOI) of ash samples collected in the furnace near flue port, was slightly over 10 wt. %. Adding oxygen at the burner corresponding to replacement of 10% of the combustion air, loss on ignition was about 7.5 wt. %, representing a reduction by about 25%.

EXAMPLE 2

A commercial low NOx coal-air burner, the RSFC™ burner described in U.S. Pat. No. 5,960,724, was fired at about 24 MMBtu/hr in a refractory lined test furnace with internal dimensions of about 7.5 ft wide×7.5 high and 34 ft long. One or two opposed pairs of over fire air ports were located at about 26 feet from the burner exit. The burner consists of a central round passage and several annular passages for coal, air, oxygen streams. The central passage was used to insert an 1.9" OD and 1.5" ID oxygen lance. Coal and primary air were injected from the first annular passage. The second, third and the fourth annular passages were used for secondary, tertiary, and quaternary air flows and were equipped with variable swirl generators to impart swirling flows. The burner is designed to provide an aerodynamically staged combustion condition. A relatively large fuel rich combustion zone is created along the axis of the burner with relatively gradual mixing of tertiary and quaternary air along the length of the furnace.

Oxygen was injected through a round lance located in the axis of the burner. The oxygen nozzle with eight ⅜ inch diameter radial holes and four ⅜ inch diameter axial holes was used to inject oxygen and to mix with the adjacent annular coal stream. The amount of oxygen injected ranged form 5 to 10% of the stoichiometric oxygen. When oxygen was injected, the stoichiometrically equivalent amount of air was taken out of the secondary, tertiary and quaternary air streams so as to maintain the same primary combustion zone and overall combustion stoichiometric ratio (SR=1.15). The primary air flow rate was kept constant at about SR=0.20. The over fire air for global combustion staging was injected perpendicular to the axis of the furnace from two to four directly opposed air ports.

The settings of adjustable swirl vanes for secondary, tertiary, and quaternary air flows were optimized to give lowest NOx emissions for air only firing and the same settings were used when oxygen was injected. Tests were carried out in a pilot scale test furnace. The test conditions are summarized below.

| | |
|---|---|
| Firing rate: | 24 MMBtu/hr |
| Coal Type: | High volatile bituminous coal from Illinois No. 6 mine |
| Particle size: | Standard pulverized coal grind |
| Overall Stoichiometric Ratio: | 1.15 |
| Primary Zone Stoichiometric Ratio: | Varied from 0.7 to 1.15 |
| Oxygen injected: | 5 and 10% of SR air replaced Avg. $O_2$ 21.7 and 22.5% |

Figure 4:
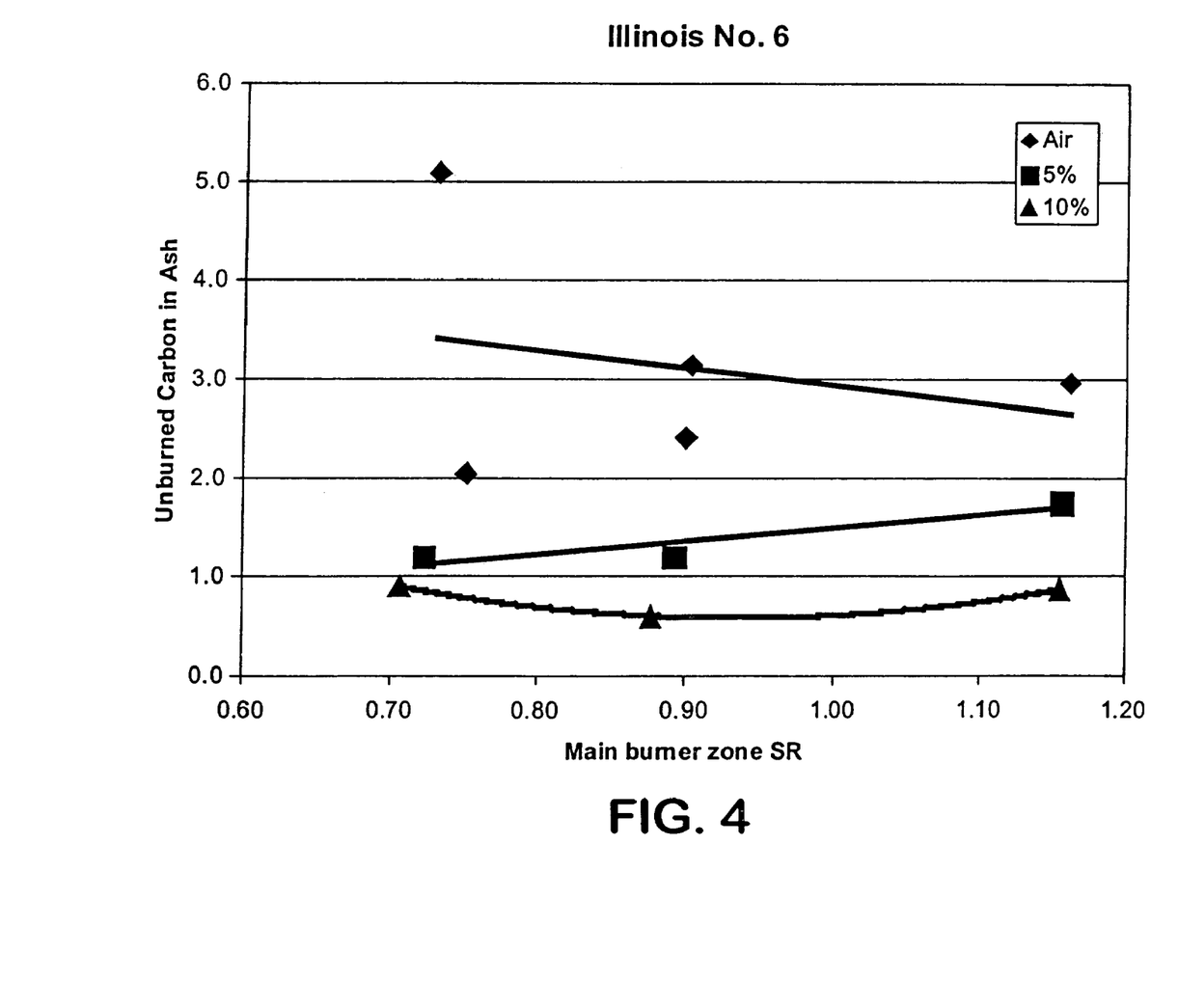
FIG. 4 shows results on unburned carbon in ash conducted with a commercial burner in a test furnace with and without applying the present invention.

FIG. 4 shows the results as unburned carbon in ash samples collected in the flue duct after the convective section of the test furnace.

Although considerable scatter exists in data, UBC was decreased by about 50 to 70% with 5% $O_2$ replacement of stoichiometric air and by about 60 to 80% with 10% $O_2$ replacement of stoichiometric air. Considering that the amount of oxygen used relative to the overall combustion air (21.7 and 22.5% $O_2$ enrichment) was less-than those tests by Farmayan, et.al. (22 and 24% $O_2$) with coal water slurry, these results were indeed surprising. Furthermore, the benefit in UBC of the present method of oxygen enhanced combustion was achieved in all primary zone stoichiometric ratios tested. The improved carbon burnout by the present invention was achieved under normal, i.e., unstaged combustion conditions as well as staged low NOx combustion conditions.

EXAMPLE 3

A full scale test was conducted in a Riley Stoker subcritical steam generator with a capacity of 44 MW. The unit was equipped with 3 Attrita coal pulverizers. Six D B Riley CCV™ Low NOx burners were arranged in two elevations on the front wall of the boiler. An overfire air (OFA) system consisting of 5 ports was located on a single elevation above the top row of burners.

Each burner consisted of a central round passage and two annular passages for the primary air stream transporting coal and a secondary air stream. The central passage was used to insert an 1.9" OD and 1.5" ID oxygen lance. Coal and primary air were injected from the first annular passage equipped with a venturi coal concentrator and four coal spreader vanes angled at 30 degrees from the axis of the burner. The second annular passage was used for secondary air flow and was equipped with variable swirl generators to impart swirling flow. The burner is designed to provide an aerodynamically staged combustion condition. A relatively large fuel rich combustion zone is created along the axis of the burner with relatively gradual mixing of secondary air along the length of the furnace.

Oxygen was injected through a round lance located in the axis of the burner. Two different types of oxygen lances were used inject oxygen and to mix with the adjacent annular coal stream. Type A lance was a straight pipe with open end. Type B lance had three rows of radial oxygen nozzles near the injection end. The amount of oxygen injected ranged from 2 to 8% of the stoichiometric oxygen. When oxygen was injected, the stoichiometrically equivalent amount of air was taken out of the secondary air stream so as to maintain the same primary combustion zone stoichiometric ratio. The primary air flow rate was kept constant at about SR=0.17.

The test conditions are summarized below.

| | |
|---|---|
| Firing rate: | 90 MMBtu/hr per burner |
| Coal Type: | High volatile bituminous coal from Bowie mine |
| Particle size: | Standard pulverized coal grind |
| Primary Zone Stoichiometric Ratio: | Varied from 0.85 to 1.15 |
| Oxygen injected: | 2 to 8% of SR air replaced Avg. $O_2$ 21.3 and 22.2% |

Figure 5:
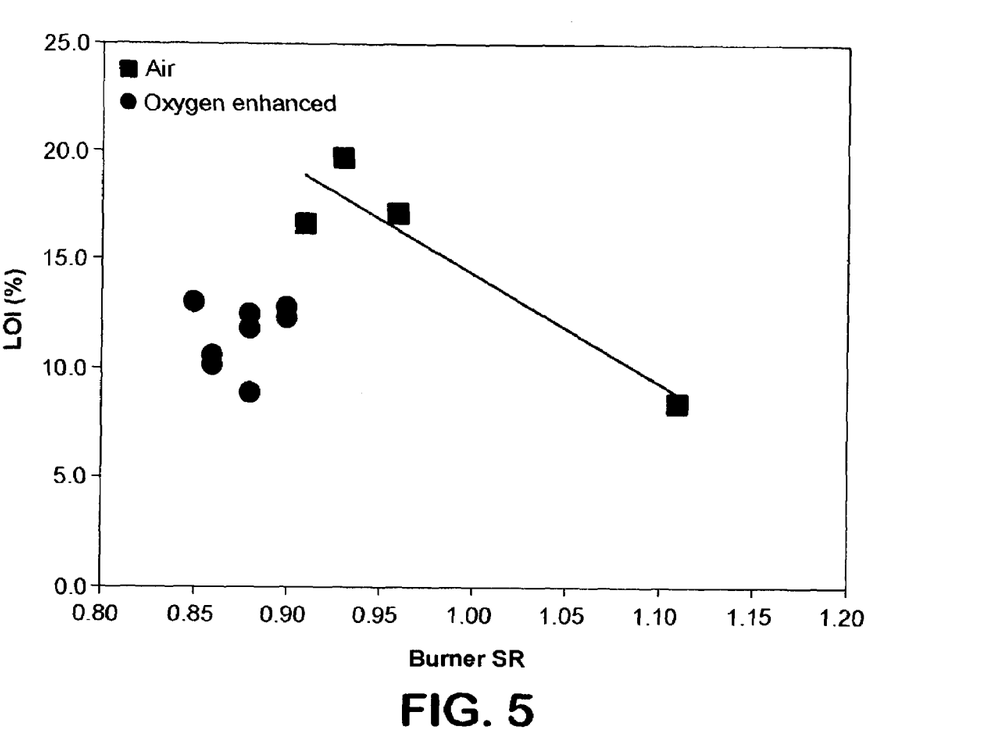
FIG. 5 is a graph of LOI (loss on ignition, a measure of the amount of unburned carbon present in the ash) with and without oxygen addition, against burner stoichiometric ratio.
Figure 6:
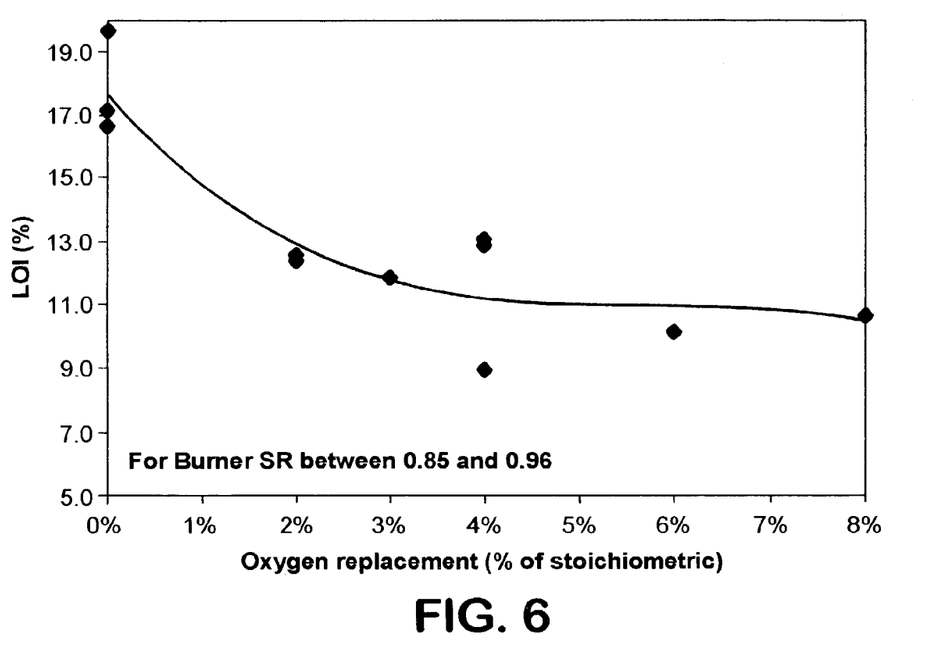
FIG. 6 is a graph of LOI against the amount of oxygen added, expressed as % oxygen replacement.

Ash samples were collected from flue gas after the economizer section under specific conditions for loss on ignition (LOI) analysis. Representative data on the effect of both staging and oxygen injection on LOI are shown in FIGS. 5 and 6. As the burner stoichiometric ratio was reduced from the unstaged condition to approximately 0.92 for the air only firing conditions, the LOI increased significantly. When the burner stoichiometric ratio was further reduced to approximately 0.85 and a small amount oxygen, corresponding to 2 to 8% of the stoichiometric oxygen, was added, the LOI was decreased significantly. Both Type A and type B oxygen lances performed equally well and little differences were observed in LOI.

FIG. 6 show the changes in LOI as a function of the amount of oxygen injected for staged combustion cases with the primary combustion zone stoichiometric ratio of between 0.85 and 0.96. LOI decreased slightly as the amount of oxygen was increased from 2% to 4% of the stoichiometric oxygen, but little additional changes were observed between 4 to 8%. Thus, in this example, economically optimum range of oxygen addition appeared to be between 2% and 4% of the stoichiometric oxygen.

Significant reduction in LOI observed in the above examples are indeed quite surprising in view of U.S. Pat. Nos. 4,495,874 and 4,596,198 which teaches little changes in furnace temperature or slag deposition with 1% enrichment. (1% oxygen enrichment is equivalent to about 8% stoichiometric oxygen injection.) Without intending to be bound by any particular explanation of the unexpected performance of this invention, direct injection of oxygen through the burner into the combustion device, without the oxygen having already been mixed with air, near the coal stream, rather than enrichment of air by premixing oxygen with an air stream, is believed to be a critical step.

When oxygen is premixed or mixed rapidly into the coal transport stream (i.e., primary air stream) using 20% of stoichiometric air and the overall combustion stoichiometric ratio is kept constant at 1.15 by reducing the stoichiometrically equivalent amount of air from secondary or tertiary air(*), the following concentrations of oxygen in the transport air stream and in the overall combustion air are calculated.

| % of stoichiometric air replaced with $O_2$ (*) | $O_2$ concentration in transport air (vol. %) | Avg. $O_2$ concentration in total combustion air (vol. %) |
| --- | --- | --- |
| 0 | 21.0 | 21.0 |
| 5 | 24.9 | 21.7 |
| 10 | 28.5 | 22.5 |
| 15 | 31.7 | 23.4 |
| 20 | 34.7 | 24.3 |

(*e.g. 5 cf of air replaced with 1.05 cf of pure $O_2$ to give the same amount of $O_2$)

Due to the small amount of oxygen used, only modest increases in the oxygen concentration of air are achieved when mixed uniformly even when oxygen is mixed only with the transport air (i.e., the primary air). Furthermore, mixing of oxygen into the coal transport air increases the risk of premature ignition of coal particles within the coal pipe and raises a safety concern. A preferred method is to inject oxygen into the coal/primary air stream at the tip of the nozzle. In this case some of the coal particles are mixed with oxygen jets and locally create zones of coal high $O_2$ mixture. Such conditions may provide zones of rapid ignition sources and facilitate early ignition and devolatilization as compared to the case oxygen is premixed with the transport air stream.

Another preferred method is to inject oxygen from the inner or outer annular space adjacent to the coal stream. In this case the favorable oxygen rich combustion condition is provided at the boundary of the coal and oxygen streams.

When oxygen is injected separately at high velocity parallel to the fuel stream, as was the case for Farmayan, et al., the oxygen jet(s) may be diluted quickly with surrounding gases and its effectiveness may be retarded. Thus, the method of oxygen injection has to be carefully designed.

Another potential method for the proposed invention is to preheat the incoming oxygen. The preheated oxygen, with temperatures up to 1600°–1800° F., will increase the temperature of the fuel rich zone, enhance combustion in this zone, and increase volatile yield. Material issues for process piping will limit the upper temperature.

While the present invention has been described with principal reference to wall-fired boilers such as the type illustrated in FIGS. 1 and 2, this description is not intended to suggest that the invention is limited in applicability to that type of combustion system. Instead, the invention is applicable to other systems wherein fuel and air are combusted, including without limitation the tangentially-fired systems of the type described with respect to FIGS. 7A–7C, and combustion systems is known in the art as "cyclone" furnaces, wherein the primary combustion zone of the furnace includes one or more enclosures each having a cylindrical wall, a closed end wall, and an open end that opens into the main chamber of the furnace through a wall of the furnace, wherein fuel, combustion air and oxidant (fed in the amounts as taught herein into the fuel) are fed through the cylindrical wall and the end wall into the enclosure in a direction such that they rotate around the central axis of rotation of the enclosure and combust to form a flame and heat of combustion which are emitted through the open end into the main chamber of the furnace.

Other types of burners can be employed in addition to those exemplified herein, such as so-called split-stream burners wherein the stream of fuel is split into a plurality of streams separated from each other, and even diverging from each other, as the fuel enters the combustion chamber. With this type of burner, the oxygen is fed from a corresponding plurality of lances into each stream of fuel, or from a lance with a plurality of nozzles oriented toward each stream of fuel, and the stoichiometric requirements of oxygen are based on the total amounts of fuel and oxygen being fed.

What is claimed is:

1. A method for combusting coal and producing ash which has a reduced carbon content, comprising providing a combustion device, feeding air and a nonaqueous stream of coal through a burner into said device, and combusting the coal in the combustion device, while feeding one or more gaseous streams that contain at least 35 vol. % $O_2$ into said coal as the coal emerges from said burner so that said $O_2$ combusts with said coal in a flame, in an amount of said $O_2$ which is less than 20% of the stoichiometric amount required for complete combustion of said coal, wherein the carbon content of the ash generated by said combustion is lower than the carbon content of ash generated by combustion carried out without said $O_2$ feeding step but under otherwise identical conditions.

2. A method according to claim 1 further comprising reducing the amount of air fed through said burner so that the total amount of $O_2$ fed into said device is between 100% and 130% of the stoichiometric amount needed for complete combustion of said coal.

3. A method according to claim 1 further comprising adding air from a source other than said burner into a region within said combustion device outside said flame, in an amount containing sufficient $O_2$ that the total amount of $O_2$ fed into said device is at least the stoichiometric amount needed for complete combustion of said coal.

4. A method according to claim 1 wherein the amount of $O_2$ fed is less than 10% of the stoichiometric amount required for complete combustion of said coal.

5. A method according to claim 1 wherein the amount of $O_2$ fed is less than 5% of the stoichiometric amount required for complete combustion of said coal.

6. A method according to claim 1 wherein a stream of coal is fed through said burner and said one or more gaseous streams that contain at least 35 vol.% $O_2$ is fed into said coal by injecting it through a hollow lance, positioned in said stream, into the coal as the coal emerges from the burner.

7. A method according to claim 1 wherein a stream of coal is fed through an annular coal passage of said burner, and said one or more gaseous streams that contain at least 35 vol.% $O_2$ is fed into said coal by injecting it through an annular passage surrounding or surrounded by said annular coal passage.

8. A method according to claim 1 wherein said said one or more gaseous streams that contain at least 35 vol.% $O_2$ is injected directly into said coal through a lance having a closed end and multiple nozzles near the end of the lance.

9. A method for reducing the carbon content of ash formed by combustion of coal in a combustion device, comprising providing a combustion device that has a primary combustion zone and a burnout zone, feeding air and a nonaqueous stream of coal through a burner into said primary combustion zone and combusting the coal in the primary combustion zone in a flame that contains a fuel-rich zone, while feeding said one or more gaseous streams that contain at least 35 vol.% $O_2$ into said coal as it emerges from said burner so that said $O_2$ combusts with said coal in said fuel-rich zone, wherein the amount of $O_2$ fed is less than 20% of the stoichiometric amount required for complete combustion of said coal and keeps the fuel-rich zone fuel-rich, while reducing the amount of air fed into said fuel-rich zone through said burner so that the total amount of $O_2$ fed into said device is between 100% and 130% of the stoichiometric amount needed for complete combustion of said coal, wherein the carbon content of the ash generated by said combustion is lower than the carbon content of ash generated by combustion carried out without said $O_2$ feeding step but under otherwise stoichiometrically identical conditions.

10. A method according to claim 9 wherein the amount of $O_2$ fed is less than 15% of the stoichiometric amount required for complete combustion of said coal.

11. A method according to claim 9 wherein the amount of $O_2$ fed is less than 10% of the stoichiometric amount required for complete combustion of said coal.

12. A method according to claim 9 wherein the amount of $O_2$ fed is less than 5% of the stoichiometric amount required for complete combustion of said coal.

13. A method according to claim 9 wherein a stream of coal is fed through said burner and said one or more gaseous streams that contain at least 35 vol.% $O_2$ is fed into said coal by injecting it through a hollow lance, positioned in said stream, into the coal as the coal emerges from the burner.

14. A method according to claim 9 wherein a stream of coal is fed through an annular coal passage of said burner, and said one or more gaseous streams that contain at least 35 vol.% $O_2$ is fed into said coal by injecting it through an annular passage surrounding or surrounded by said annular coal passage.

15. A method according to claim 9 wherein said said one or more gaseous streams that contain at least 35 vol.% $O_2$ is injected directly into said coal through a lance having a closed end and multiple nozzles near the end of the lance.

16. A method for operating a combustion device, comprising feeding air and a nonaqueous stream of coal through a burner into said device, and combusting said coal in said device in a flame that has a fuel-rich zone, while feeding said one or more gaseous streams that contain at least 35 vol.% $O_2$ into said coal as it emerges from said burner so that said $O_2$ combusts with said coal in said fuel-rich zone, wherein the amount of $O_2$ fed is less than 20% of the stoichiometric amount required for complete combustion of said coal and keeps the fuel-rich zone fuel-rich, while feeding air from a source other than said burner into a region within said device, outside said fuel-rich zone, in an amount containing sufficient $O_2$ that the total amount of $O_2$ fed into said device is at least the stoichiometric amount needed for complete combustion of said coal, wherein the carbon content of the ash generated by said combustion is lower than the carbon content of ash generated by combustion carried out without said $O_2$ feeding step but under otherwise stoichiometrically identical conditions.

17. A method according to claim 16 wherein the amount of $O_2$ fed is less than 15% of the stoichiometric amount required for complete combustion of said coal.

18. A method according to claim 16 wherein the amount of $O_2$ fed is less than 10% of the stoichiometric amount required for complete combustion of said coal.

19. A method according to claim 16 wherein the amount of $O_2$ fed is less than 5% of the stoichiometric amount required for complete combustion of said coal.

20. A method according to claim 16 wherein a stream of coal is fed through said burner and said one or more gaseous streams that contain at least 35 vol.% $O_2$ is fed into said coal by injecting it through a hollow lance, positioned in said stream, into the coal as the coal emerges from the burner.

21. A method according to claim 16 wherein a stream of coal is fed through an annular coal passage of said burner, and said one or more gaseous streams that contain at least 35 vol.% $O_2$ is fed into said coal by injecting it through an annular passage surrounding or surrounded by said annular coal passage.

22. A method according to claim 16 wherein said said one or more gaseous streams that contain at least 35 vol.% $O_2$ oxygen is injected directly into said coal through a lance having a closed end and multiple nozzles near the end of the lance.

* * * * *